United States Patent [19]

Traweek

[11] 4,155,342
[45] May 22, 1979

[54] LASSO GUN

[76] Inventor: Lowell E. Traweek, 8392 Snowbird Dr., Huntington Beach, Calif. 92646

[21] Appl. No.: 847,705

[22] Filed: Nov. 2, 1977

[51] Int. Cl.² ............................................. F41B 7/00
[52] U.S. Cl. .................................... 124/27; 124/36; 124/41 A; 119/153
[58] Field of Search ............... 124/1, 16, 35, 36, 41 R; 43/8; 119/153

[56] References Cited

U.S. PATENT DOCUMENTS

| | | | |
|---|---|---|---|
| 2,732,647 | 1/1956 | Byars | 43/8 |
| 2,891,342 | 6/1959 | Grable et al. | 124/16 X |
| 3,160,977 | 12/1964 | Kickliter | 124/36 X |
| 3,949,514 | 4/1976 | Ramsey | 119/153 X |

Primary Examiner—Richard C. Pinkham
Assistant Examiner—William R. Browne
Attorney, Agent, or Firm—K. H. Boswell

[57] ABSTRACT

A lasso gun used in accurately propelling a lasso toward a target is described. The lasso gun has a barrel. Communicating along the longitudinal axis of the barrel is a piston which has a front lasso holder attached. The barrel is provided with a spring. When the piston is slid from the discharge end of the barrel towards the other end, the spring is put under tension and when released the piston is forcibly slid back towards the discharge end of the barrel. An arm is pivotally mounted on the underside of the barrel. The arm has a rear lasso holder attached to its free end. The loop of a lasso is placed around both the front and rear lasso holders, the piston pushes away from the discharge end of the barrel tensing the spring and the arm is swung back away from the discharge end of the barrel. When released or fired, the piston is propelled forward and the forward motion transferred to the lasso loop. This causes the rear end of the loop to pull the arm and the bottom end of the loop attached to it forward in an arc. After the piston reaches the end of its slide and abruptly stops, the lasso is propelled off of the front and rear lasso holders towards a target.

10 Claims, 7 Drawing Figures

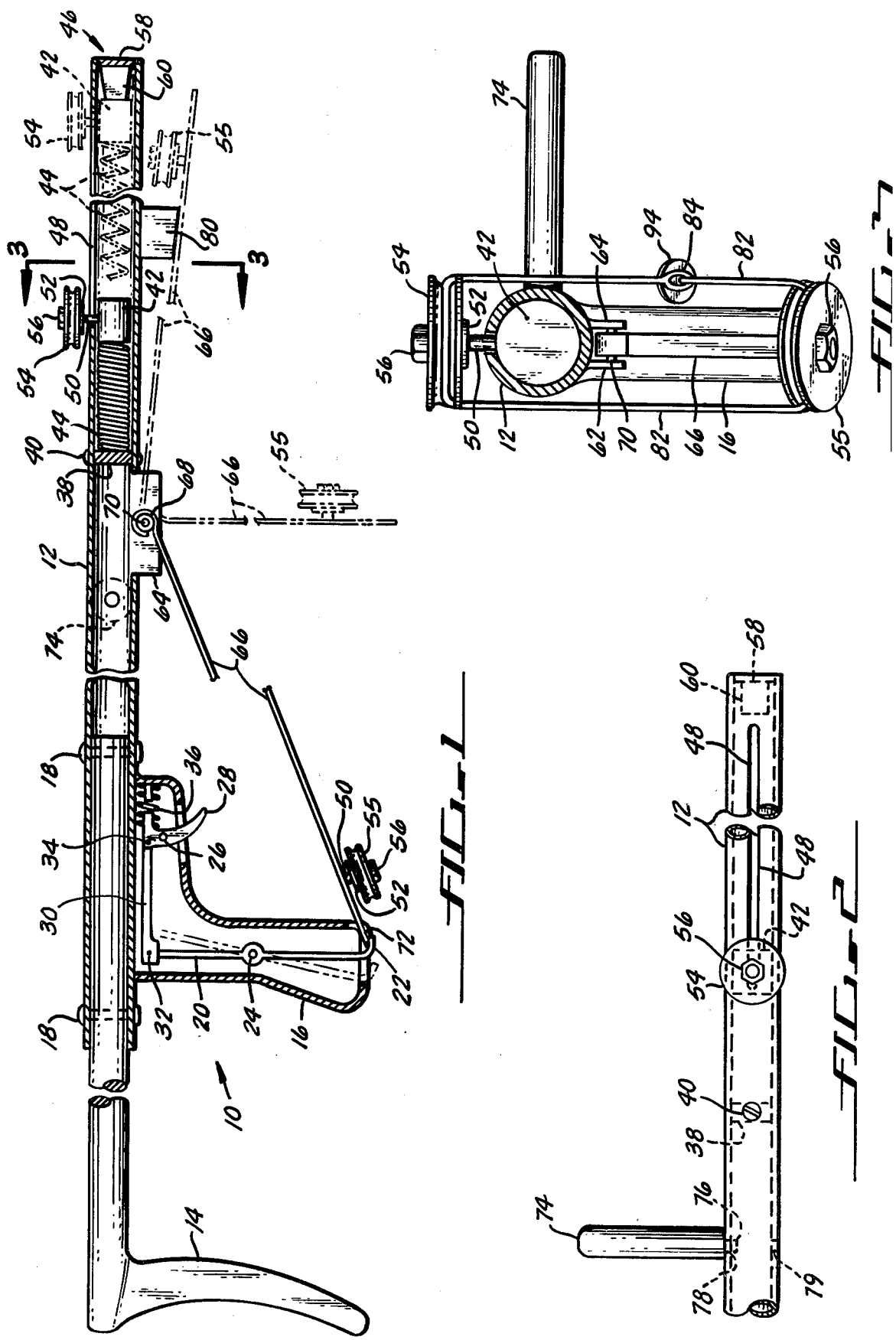

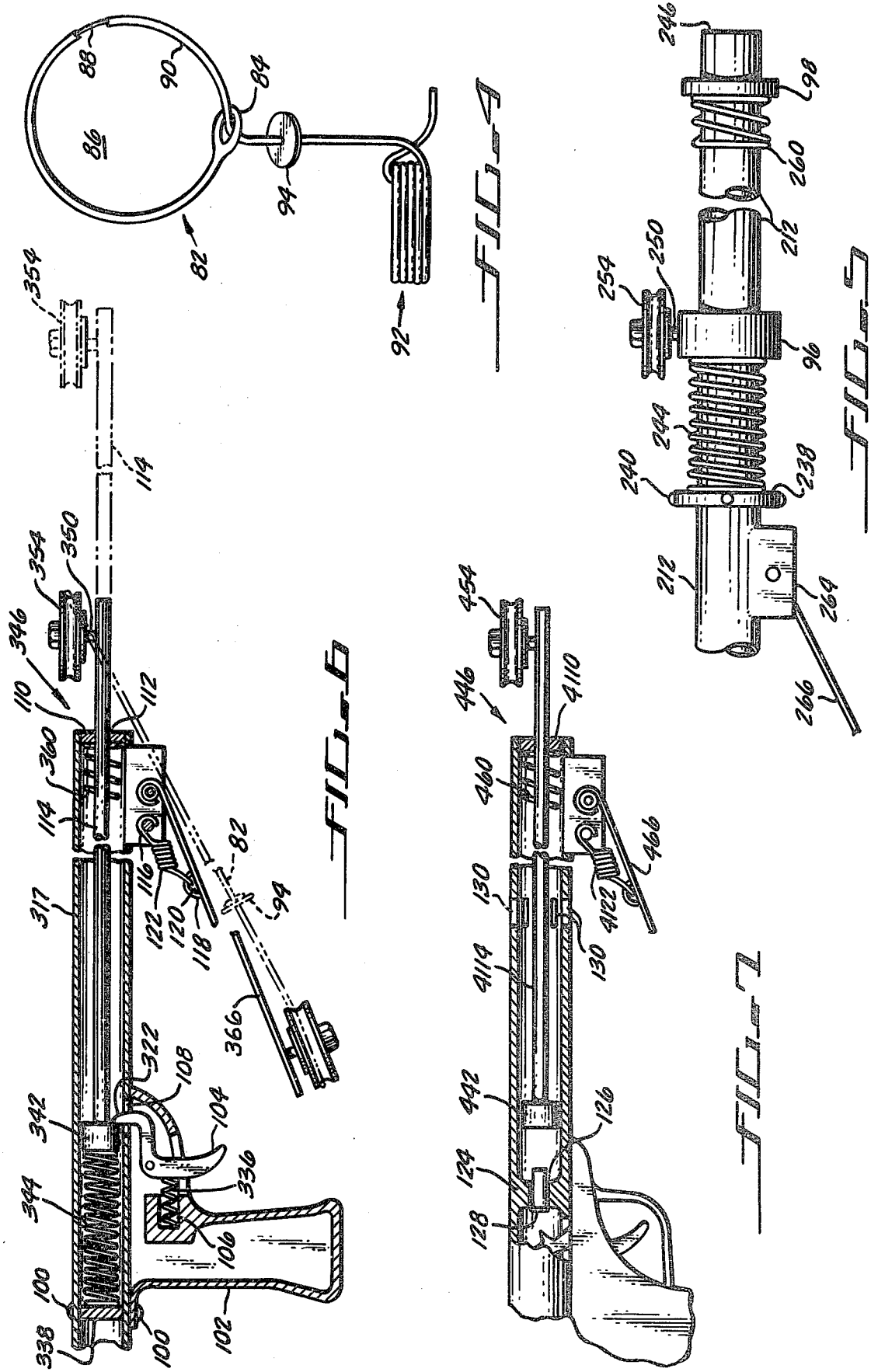

LASSO GUN

BACKGROUND OF THE INVENTION

This invention is directed to a new animal control device wherein an animal is snared by a lasso propelled by a gun.

In the field of animal control there are presently several alternative methods which an animal control officer can use to capture or contain a frightened or dangerous animal.

Because of humane reasons, actually killing or wounding the animal is only justified in the most serious circumstances. The tranquilizer gun was developed because incapacitation of an animal, shot with a tranquilizer dart, is reversible. However, because the animal control officer is faced with a variety of sizes of animals, e.g., a 130 pound German Shepard dog vs. a 20 pound racoon, the animal control officer must be equipped with an arsenal of different size and/or strengths of darts. Further, since the drug solution used in the darts is potentially dangerous if used improperly, it must be kept under strict control.

Another widely used method of capture involves the snare or capture stick of the type having a loop at one end of a pole. The use of the capture stick is predicated upon the officer being able to approach close enough to the animal, usually from two to five feet, to slip the snare over the animal's head. In attempting to capture an especially timid animal, such as a dog, coyote or bobcat, it is sometimes impossible to get near enough to the animal to use the capture stick. Further even at close range, since the animal can see the stick slowly approaching, the animal may suddenly run out of range.

The common lasso could also be used by an animal control officer; however, even though simple in construction, the lasso is difficult to use. The mastery of its technique seemly being confined to ranch hands, rodeo stars and the like, who grew up with a rope in their hands.

SUMMARY OF THE INVENTION

It is a broad object of this invention to provide a devise useful to an animal control officer to humanely capture a frightened or dangerous animal. It is a further object to allow the officer to do this without endangering himself. It is still a further object to provide a devise which an officer can use at a greater distance than devices now in use and additionally is rapid in action thus suprising the animal before it has a chance to run away. Additionally, it is an object to provide a device which does not require the use of drugs. Still further objects of the invention include providing a device which is simple to use and easy to become proficient in its use.

In accordance with this invention these and still other objects, features and attendant advantages of the present invention are achieved by providing a lasso gun having a barrel, the barrel having a discharge end and an operator end. Communicating along the longitudinal axis of the barrel is a piston which has a front lasso holder attached to it. The barrel is provided with a spring which biases the piston towards the discharge end of the barrel. When the piston is slid towards the operator end of the barrel, the spring is tensed and when released, the piston forcibly slides back towards the discharge end of the barrel. Pivotally mounted on the barrel is an arm. Adjacent to the free end of the arm is a rear lasso holder. Because the arm is pivotally mounted on the barrel, the rear lasso holder swings in an arc about the pivot. The loop portion of a lasso is encircled around the front and rear lasso holders. The piston is pushed toward the operator end of the barrel, tensing the spring and the arm is swung toward the operator end of the barrel.

When discharged, the piston forcibly slides towards the discharge end of the barrel. This motion is communicated to the loop and further to the arm by the loop. The rear lasso holder and the portion of the lasso attached to it are swung through the arc. The piston comes to an abrupt rest adjacent to the discharge end of the barrel and the lasso is propelled off of the end of the barrel towards a target.

BRIEF DESCRIPTION OF THE DRAWINGS

The invention will be more fully understood and described when taken in conjunction with the accompanying drawings in which:

FIG. 1 is an elevational view in partial section of a first alternate embodiment of the invention;

FIG. 2 is a top view of the forward end of the barrel of the invention shown in FIG. 1;

FIG. 3 is a front view of the invention take at the line 3—3 of FIG. 1;

FIG. 4 is a plan view of the lasso portion of the invention;

FIG. 5 is a plan view of the forward end of a second embodiment of the invention;

FIG. 6 is an elevational view in partial section of a portion of a third alternate embodiment of the invention;

FIG. 7 is an elevational view in partial section of a forth alternate embodiment of the invention.

DETAIL DESCRIPTION OF THE INVENTION

Referring now to the drawings and particularly to FIG. 1, the lasso gun 10 is shown having a barrel 12. Attached to barrel 12 is a shoulder fitting stock 14 and a hand grip 16. Stock 14 and hand grip 16 are jointly mounted to barrel 12 by two long rivets 18. Hand grip 16 has a hollow interior. Mounted within hand grip 16 is a lever 20. Intergally formed on the end of lever 20 and projecting out of the bottom of hand grip 16 is a dog 22. Lever 20 is pivotally mounted to hand grip 16 by a pin 24. Also pivotally mounted to hand grip 16 by pin 26 is trigger 28. A rod 30 has one end pivotally mounted to lever 20 by pin 32 and the other end pivotally mounted to trigger 28 by pin 34. Thus the movement of trigger 28 is transferred to dog 22. A spring 36 between the upper end of trigger 28 and the interior wall of hand grip 16 biases the trigger-lever-dog assembly such that dog 22 is reversibly retained in a forward position.

Within barrel 12 is a partition 38 attached to barrel 12 by screws 40. A piston 42 is slidably mounted within barrel 12. Between partition 38 and piston 42 is a compression spring 44 which biases piston 42 towards the discharge end 46 of barrel 12. As shown in FIGS. 2 and 3 a slit 48 extends along the top surface of barrel 12 between partition 38 and discharge end 46. A pin 50, threaded at both ends, threads into piston 42 and projects out of slit 48. As piston 42 slides in barrel 12, pin 50 slides in slit 48. Pin 50 has a flange 52. Fitting on pin 50 and abutting against flange 52 is a front lasso holding pulley 54. Pulley 54 is secured to pin 50 by a nut 56 which threads onto the end of pin 50.

The discharge end 46 of barrel 12 is fitted with internal threads to receive end cap 58 via external threads around its periphery. Attached to end cap 58 is a rubber bumper 60. Piston 42 is slid along the longitudinal axis of barrel 12 away from discharge end 46. This compresses spring 44 between piston 42 and partition 38. When released, piston 42 forcibly slides back towards discharge end 46 and when it reaches discharge end 46, it mates against bumper 60 which absorbs the shock of piston 42 and abruptly halts its motion.

On the side of barrel 12 opposite slit 48 are shoulders 62 and 64. Shoulders 62 and 64 each have a bore through their surface perpendicular to the longitudinal axis of barrel 12. An arm 66 has a bearing surface 68 on one end. Bearing surface 68 fits between shoulders 62 and 64 and a journal pin 70 is force fitted through the bores in shoulders 62 and 64, pivotally retaining arm 66 between shoulders 62 and 64. Attached adjacent to the other end of arm 66 is a second pin 50 having a flange 52 fitted with a rear lasso holding a pully 55 retained by a nut 56. Arm 66 pivots about bearing 68 allowing free end 72 to swing in an arc. At one end of the arc, free end 72 and pulley 55 attached thereon, approach the discharge end 46 of barrel 12. At the other end of the arc, free end 72 abuts against the bottom of hand grip 16 and is reversibly retained against hand grip 16 by dog 22.

Attached on the side of barrel 12 is an optional hand grip 74. Hand grip 74 has a threaded stud 76 projecting out of one end which screws into one of two threaded bores 78 & 79 in barrel 12. One bore 78 is on one side at barrel 12 the other bore 79 is on the other side, thus hand grip 74 can be attached to either side to accommodate either a right or left handed operator. A second bumper 80 can optionally be mounted on barrel 12 to prevent arm 66 or pulley 55 from forcibly striking barrel 12.

As shown in FIG. 4, lasso 82 consists of a line having a running noose 84 attached to one end. The line has two joined portions, each composed of a different material. The loop portion 86 is a small metal cable 88 which is covered by a flexible plastic tubing 90. This construction is preferred because an animal cannot bite through the cable 88 but is protected from injury by said metal cable 88 since said cable is covered with flexible plastic tubing 90. Additionally, a loop of this construction tends to assume a circular shape. The following line portion 92 of the line is a light weight but strong nylon cord. Following line 92 joins loop 86 at a running noose stop 94. Running noose stop 94 is a ring or ball with a diameter greater than the internal diameter of the running noose 84, thus it limits the travel of running noose 84 on the line. This limits the size of the loop portion 86 of the lasso 82.

In operation, the loop portion 86 of lasso 82 is fitted around the front surface of pulley 54, over the barrel and around pulley 55. The loop is used to pull piston 42 away from discharge end 46 of barrel 12, compressing spring 44. Arm 66 is pivoted toward hand grip 16 and abutted against the bottom of hand grip 16 and retained thereby dog 22. Spring 44 urges piston 42 and pulley 54, attached to it, forward towards discharge end 46. This stretches lasso loop 86 between pulleys 54 and 55 until lasso loop 86 is stretched to its maximum size with running noose 84 abutting against running noose stop 94. Further movement of the piston is prevented by lasso loop 86 communicating with arm 66 and dog 22. The lasso gun is thus in a cocked mode. Since pulleys 54 and 55 are free to turn, loop 86 automatically centers itself as it stretches to its maximum diameter. Also loop 86 can be rotated on pulleys 54 and 55 so that the running noose and running noose stop are not touching the pulleys.

When the trigger is pulled, dog 22 moves in respect to said trigger movement and releases end 72 of arm 66. Since spring 44 is compressed, piston 42 forcibly moves forward pulling lasso loop 86 and arm 66 with it. Arm 66 pivots about bearing surface 68 thus forces the portion of lasso loop 86 which is around pully 55 to move through an arc. At first it goes away from the barrel 12 until arm 66 is in middle point, perpendicular to barrel 12, and then it starts to approach barrel 12. As arm 66 continues to approach barrel 12, the loop becomes free of pulley 55. When piston 42 reaches bumper 60 it abruptly stops; however, loop 86 continues and as lasso 82 is propelled from the lasso gun towards a target, the loop portion 86 assumes an essentially circular shape, easily encircling the target.

In FIG. 5 there is shown a second alternate form of certain portions of the invention. Components which are extremely similar to those used in FIGS. 1 through 3 are referred to in the drawings and the remaining portions of the specification by numerals previously used to designate such parts preceded by the numeral 2. The forward portion of barrel 212 has an arm 266 pivotally attached at shoulder 264. Forward of shoulder 264 is partition ring 238 mounted to barrel 212 by screws 240. A sleeve 96 slides along barrel 212 along it longitudinal axis. Fitted around barrel 212 between partition ring 238 and sleeve 96 is a compression spring 244. Attached to sleeve 96 via pin 250 is front lasso holding pulley 254. Attached to barrel 212 adjacent to discharge end 246 is sleeve stop 98. Attached to sleeve stop 98, between sleeve stop 98 and sleeve 96, is bumper spring 260.

In FIG. 6 there is shown a third alternate form of certain portions of the invention. Components which are extremely similar to those used in FIGS. 1 through 3 are referred to in the drawings and the remaining portions of the specification by numberals previously used to designate such parts preceded by the numeral 3. Secured to barrel 312 by screws 100 is hand grip 102 and partition 338. Trigger 104 is pivotally mounted in hand grip 102 and is biased by spring 336 fitted in cavity 106 of hand grip 102. A dog 322 intergally attached to trigger 104 projects into barrel 312 via hole 108. A piston 342 fits into barrel 312 and is reversibly retained by dog 322. A compression spring 344 is placed between piston 342 and partition 338. The discharge end 346 of barrel 312 is thread with internal threads. An end cap 110 having external threads around its periphery and a central bore 112 is threaded into the discharge end 346 of barrel 312. A rod 114 is attached to piston 342 and extends through barrel 312 and bore 112 of end cap 110. A pulley 354 is attached to the end of rod 114 via a pin 350. A bumper spring 360 is attached to the inside of end cap 110.

Piston 342 via rod 114 and pulley 354 is slid towards partition 338 compressing spring 344. After passing hole 108 piston 342 is reversibly retained in a cocked position by dog 322. An arm 366 having a rear lasso holding pulley 355 is attached to shoulders 362 & 364 by bearing surface 368 as previously described. Additional one of shoulder 362 or 364 contains a pin 116 and arm 366 has a shoulder 118 having a bore 120 therein. A tension spring 122 having one end connected to pin 116 and the other end connected to bore 120 biases arm 366 towards barrel 312. When piston 342 is in a cocked position and a lasso loop 86 is fitted on pulleys 354 and 355, tension spring 122 biases arm 366 towards barrel 312 and maintain lasso loop 86 taunt on pulleys 354 and 355. When trigger 104 is pulled, dog 322 released piston 342 forcing pulley 354 to pull lasso loop 86. This motion is transferred by the loop 86 to pulley 355 and arm 366. Since compression spring 344 is of greater strength than tension spring 122, arm 366 is moved away from barrel 312 against the bias of tension spring 122.

In FIG. 7 there is shown a fourth alternate form of certain portions of the invention. Components which are extremely similar to those used in FIGS. 1 through 6 are referred to in the drawings and the remaining portions of the specification by numerals previously used to designate such parts preceded by the numberal 4. A barrel 412 has a piston 442, rod 4114, pulley 454, end cap 4110, bumper spring 460 assembly as previously described. Arm 466 having tension spring 4122 is also as previously described. The rear of barrel 412 has a breech 124. Breech 124 has a cavity 126 for receiving a blank cartridge 128. Breech 124 is also fitted with other standard components, eg breech-block, firing pin, not described but well known to those in the art of fire arms manufacture. Barrel 412 has a series of slots, commonly designated as numeral 130, extending around its circumference adjacent to the discharge end 446 of barrel 412. The lasso gun of FIG. 7 is discharged by firing blank cartridge 128. The gases produced expands and force piston 442 towards the discharge end of barrel 412 communicating its motion to pulley 454 and a lasso as previously described. Just before abutting against bumper spring 460, piston 442 passes over slots 130 and exposes them to the breech end of the barrel. This allows the expansion gases to exit to the atmosphere and piston 442 to come to rest against bumper spring 460.

As shown in FIGS. 1, 2, 3, 5 and 6, the respective pistons are propelled by compression springs. Alternately, the respective pistons could be propelled by tension springs fastened to the pistons and the respective end caps or sleeve stop. Additionally a strong rubber or other elastic material could be substituted for a tension spring. The propulsive force shown in FIG. 7 is that of a blank cartridge. Alternately, other gas discharge systems such as a carbon dioxide cartridge could be used.

The variously illustrated lasso guns all utilize certain intangible features or concepts as are verbally set forth and defined in the appended claims. It will of course be realized that these concepts can be utilized with a variety of somewhat differently appearing and differently constructed devices through the use or exercise of routine design skill in this particular field.

I claim:

1. A lasso gun which comprises: a barrel, said barrel having a discharge end and an operator end, sliding means slidably communicating with said barrel along the longitudinal axis of said barrel, front lasso holding means reversibly holding a lasso mounted on said sliding means, activating means for forcibly sliding said sliding means along the longitudinal axis of said barrel from a first position distal to said discharge end of said barrel to a second position proximal to said discharge end of said barrel, an arm, said arm having pivot means on one end and a rear lasso holding means reversibly holding a lasso adjacent to the other end, said arm pivotally mounted about said pivot means on said barrel such that the rear lasso holding means moves in an arc with one end of the arc being towards the operator end of said barrel and the other end of the arc being toward the discharge end of said barrel, lasso means for lassoing a target, said lasso means having a lasso, said lasso having a loop, said loop encircling said front and said rear lasso holding means when said sliding means is in said first position and said rear lasso holding means is at the end of the arc toward said operator end of said barrel, such that when said sliding means slides from said first position towards the discharge end of said barrel, the motion of said sliding means is transferred to said lasso by said front lasso holding means via said loop of said lasso and said loop also pulls said rear lasso holding means through said arc and as said rear lasso holding means approaches the end of the arc toward the discharge end of said barrel and said sliding means approaches and stops in said second position, and said lasso is discharged from the discharge end of said barrel towards a target.

2. The lasso gun of claim 1 including: gripping means mounted on said barrel, and trigger means mounted on said barrel, such that when said trigger means is triggered, said sliding means slides from said first position towards the discharge end of said barrel, the motion of said sliding means is transferred to said lasso by said front lasso holding means via said loop of said lasso and said loop also pulls said rear lasso holding means through said arc and as said rear lasso holding means approaches the end of the arc toward the discharge end of said barrel and said sliding means approaches and stops in said second position, said lasso is discharged from the discharge end of said barrel towards a target.

3. The lasso gun of claim 2 wherein: said lasso means comprises a lasso of the type having a line, said line having a running noose at one end and the other end of said line threading through said running noose to form a loop in a portion of said line, a running noose stopping means for limiting the size of said loop, said running noose stopping means mounted on said portion of said line not forming said loop such that the position of said running noose stopping means on said line determines the maximum size of said loop.

4. A lasso gun which comprises: a barrel, said barrel having a stock end and a discharge end, a stock mounted on the stock end of said barrel, retaining means mounted on said barrel, trigger means, said trigger means communicating with said retaining means such that movement of said trigger means is transferred to said retaining means, an arm having pivot means for pivoting said arm, said pivot means attached on one end of said arm and rear lasso holding means reversibly holding a lasso and attached proximal to the other end, said arm pivotally mounted on said barrel such that said rear lasso holding means moves in an arc, said arm reversibly retained by said retaining means, sliding means slidably communicating with said barrel, front lasso holding means reversibly holding a lasso mounted on said sliding means, biasing means forcibly sliding said sliding means along the longitudinal axis of said barrel toward said discharge end of said barrel, lasso means for lassoing a target, said lasso means having a lasso, said lasso having a loop, said loop encircling said front and rear lasso holding means such that said loop is held under tension between said front and rear lasso holding means by said biasing means when said arm is retained by said retaining means and when said trigger means is triggered, said retaining means releases said arm and said arm is pivoted forward by said loop which in turn is propelled forward by said front lasso holding means attached to said sliding means, which causes said lasso to be discharged from said barrel.

5. The lasso gun of claim 4 including: a hand grip attached to said barrel, said hand grip having a hollow interior, a lever pivotally mounted within said hollow interior of said hand grip, a dog on one end of said lever, said dog projecting out of the bottom end of said hollow interior of said hand grip, a trigger means, said trigger means communicating with said lever such that movement of said trigger means is transferred to said lever and said dog, said arm having a pivot end and a free end, said pivot end being pivotally mounted on said barrel such that said free end of said arm fits adjacent to the bottom of said hand grip and is reversibly retained thereby said dog, a rear lasso holding means mounted on said arm proximal to said free end of said arm, said loop encircling said front and rear lasso holding means such that said loop is held under tension between said front and rear lasso holding means by said biasing means when said arm is retained by said dog and when said trigger means is triggered, said dog releases said arm and said arm is pivoted forward by said loop which in turn is propelled forward by said front lasso holding means attached to said sliding means, which causes said lasso to be discharged from said barrel.

6. The lasso gun of claim 5 which comprises: said barrel having a cap mounted on the discharge end of said barrel, said cap having a central bore, a piston slidably mounted in said barrel, a rod, said rod extending through said bore in said cap, said rod having one end affixed to said piston, said front lasso holding means attached to the other end of said rod.

7. The lasso gun of claim 5 which comprises: said barrel having a slit, said slit extending along the longitudinal axis of said barrel from a point proximal to the discharge end of said barrel toward the stock end of said barrel, a piston, said piston slidably mounted within said barrel, a pin, said pin mounted on said piston and extending from said piston perpendicular to the longitudinal axis of said barrel through said slit in said barrel, said front lasso holding means attached to said pin.

8. The lasso gun of claim 5 wherein: said biasing means comprises in combination a compression spring within said barrel, and a partition means serving as a support for said compression spring, said partition means mounted within said barrel such that when said sliding means is slid toward said stock end of said barrel, said compression spring is compressed between said sliding means and said partition means.

9. The lasso gun of claim 5 wherein: said front lasso holding means and said rear lasso holding means comprise rotatively mounted pulleys.

10. The lasso gun of claim 5 where said lasso means comprises: a lasso, said lasso having a line, said line having a first portion of light steel cable coated with a flexible plastic coating, said first portion having a running noose at one end, said first portion threading through said running noose and forming a loop, said line having a second portion of nylon rope, a running noose stopping means for limiting the size of said loop, said first and second portion of said line joining at said running noose stopping means.

* * * * *